US011918008B2

(12) United States Patent
Feigelman

(10) Patent No.: US 11,918,008 B2
(45) Date of Patent: Mar. 5, 2024

(54) COCOA POWDER SUBSTITUTES DERIVED FROM SPENT COFFEE GROUNDS AND METHODS FOR THE PRODUCTION THEREOF

(71) Applicant: The Kawa Project Inc., Benicia, CA (US)

(72) Inventor: Aaron Matthew Feigelman, Benicia, CA (US)

(73) Assignee: The Kawa Project Inc., Benicia, CA (US)

( * ) Notice: Subject to any disclaimer, the term of this patent is extended or adjusted under 35 U.S.C. 154(b) by 0 days.

(21) Appl. No.: 18/179,545

(22) Filed: Mar. 7, 2023

(65) Prior Publication Data

US 2023/0276820 A1 Sep. 7, 2023

Related U.S. Application Data

(60) Provisional application No. 63/317,302, filed on Mar. 7, 2022.

(51) Int. Cl.
*A23F 5/48* (2006.01)
*A23F 5/38* (2006.01)
*A23G 1/42* (2006.01)

(52) U.S. Cl.
CPC .............. *A23F 5/48* (2013.01); *A23F 5/38* (2013.01); *A23G 1/423* (2013.01)

(58) Field of Classification Search
CPC .............. A23F 5/48; A23F 5/38; A23G 1/423
See application file for complete search history.

(56) References Cited

U.S. PATENT DOCUMENTS

| 4,312,890 | A | 1/1982 | Liggett |
| 5,676,993 | A | 10/1997 | Watterson et al. |
| 2020/0288742 | A1 | 9/2020 | Morales et al. |
| 2022/0022481 | A1* | 1/2022 | Leggett ................ A23F 5/10 |

FOREIGN PATENT DOCUMENTS

WO 2013029193 A1 3/2013

OTHER PUBLICATIONS

English Abstract Del Castillo WO2014/128320 (Year: 2014).*

* cited by examiner

*Primary Examiner* — Katherine D Leblanc
(74) *Attorney, Agent, or Firm* — Climate Patent Collective LLC

(57) ABSTRACT

A method for production of a cocoa powder substitute includes: drying a spent coffee ground material, previously utilized in a coffee brewing process, to a moisture content of less than 10% by mass to produce a dried spent coffee ground material; extracting oil from the dried spent coffee ground material to produce a coffee flour material characterized by a fat content of less than 5% by mass; milling the coffee flour material to an average particle size of less than 250 microns; and flavoring the coffee flour material to produce a cocoa-homologous flavor in the coffee flour material.

20 Claims, 14 Drawing Sheets

S100, (100)

"spent coffee ground material"

Drying to a moisture content of less than 10% by mass
S110

"dried spent coffee ground material"

Extracting oil resulting in a fat content of less than 5% by mass
S120

"coffee flour material"

Milling to an average particle size of less than 250 microns
S130

"coffee flour material"

Flavoring via a cocoa-homologous fermentation process
S144

"fermented coffee flour material"

Roasting to generate Maillard reaction products
S150

"cocoa powder substitute" (100)

"cocoa powder substitute" (100)

Treating the cocoa powder substitute with an alkalizing agent
S180

"alkalized cocoa powder substitute"

COCOA POWDER SUBSTITUTES DERIVED FROM SPENT COFFEE GROUNDS AND METHODS FOR THE PRODUCTION THEREOF

CROSS-REFERENCE TO RELATED APPLICATIONS

This Application claims the benefit of U.S. Provisional Application No. 63/317,302, filed on 7 Mar. 2022, which is incorporated in its entirety by this reference.

TECHNICAL FIELD

This invention generally relates to the fields of food alternatives and food waste management and, more specifically, to a new cocoa powder substitute and production method in the fields of food alternatives and food waste management.

BRIEF DESCRIPTION OF THE FIGURES

FIG. 3C is a flowchart representation of one variation of the method for producing the cocoa powder substitute including flavoring via the cocoa-homologous fermentation process and subsequent roasting step.

FIG. 8 is a flowchart representation of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

Descriptors such as "approximately" indicate intervals of plus or minus 5% of the absolute value given (i.e., "approximately 5%" indicates a value between 4.75% and 5.25%) unless otherwise specified. Terms such as "first," "second," "third," etc. do not imply order unless otherwise specified and instead indicate non-ordered instances of the object so described.

1. Cocoa Powder Substitute

Figure 1:
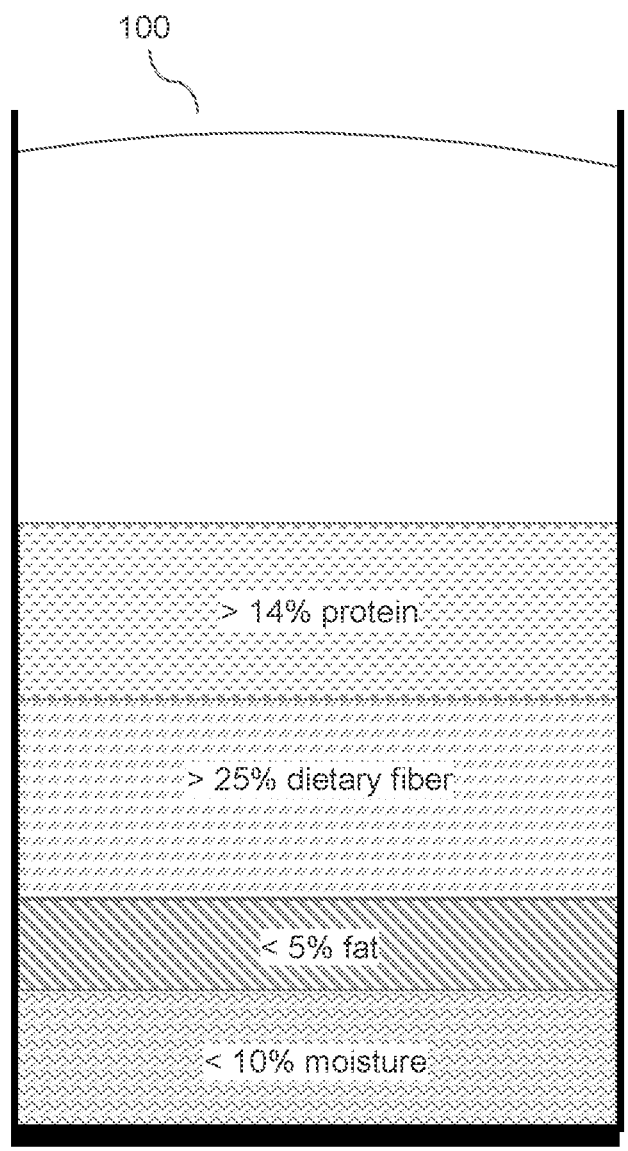
FIG. 1 is a schematic representation of a cocoa powder substitute.

As shown in FIG. 1, a cocoa powder substitute 100 includes a spent coffee ground material: utilized in a coffee brewing process; dried to a moisture content of less than 10% by mass; defatted to an oil content of less than 5% by mass; flavored with artificial cocoa flavoring; and milled to an average particle size of less than 250 microns.

In one variation, the cocoa powder substitute 100 includes a spent coffee ground material: utilized in a coffee brewing process; dried to a moisture content of less than 10% by mass; defatted to an oil content of less than 5% by mass; flavored via a cocoa-based fermentation process; and milled to an average particle size of less than 250 microns.

In yet another variation, the cocoa powder substitute 100 includes a spent coffee ground material: utilized in a coffee brewing process; dried to a moisture content of less than 10% by mass; fermented via a cocoa-based fermentation process; roasted to develop a cocoa-like flavor profile via Maillard reactions; and milled to an average particle size of less than 250 microns.

In yet another variation, the cocoa powder substitute 100 includes a spent coffee ground material: previously utilized as a brewing material in a coffee brewing process; and characterized by a moisture content of less than 10% by mass, a fat content of less than 5% by mass, a dietary fiber content greater than 25% by mass, a protein content greater than 14% by mass, and an average particle size of less than 250 microns.

2. Method

Figure 2:
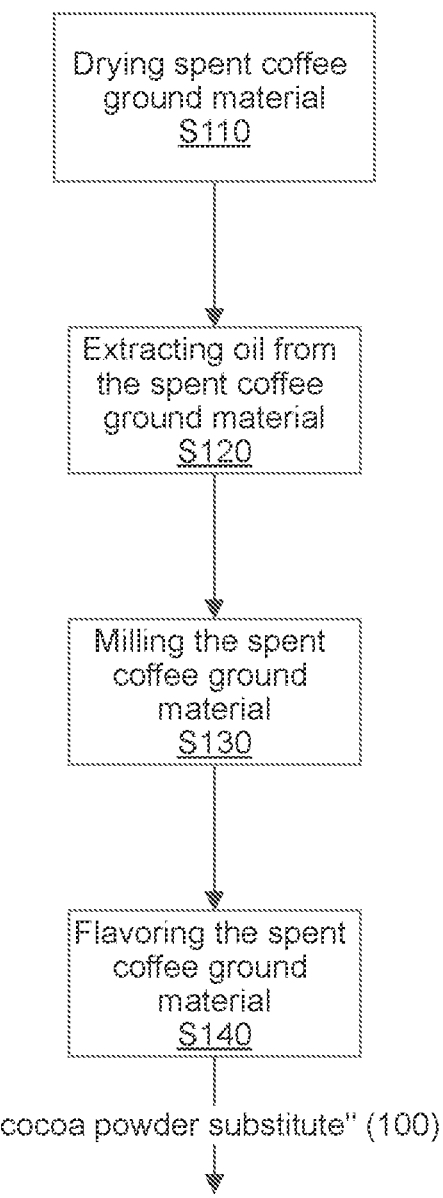
FIG. 2 is a flowchart representation of a method for producing the cocoa powder substitute.

As shown in FIG. 2, a method S100 for production of a cocoa powder substitute includes: drying a spent coffee ground material, previously utilized in a coffee brewing process, to a moisture content of less than 10% by mass in Step S110; extracting oil from the spent coffee ground material to achieve a fat content of the spent coffee ground material to less than 5% by mass in Step S120; milling the spent coffee ground material to an average particle size of less than 250 microns in Step S130; and flavoring the spent coffee ground material to produce a cocoa-homologous flavor in the spent coffee ground material in Step S140.

Figure 3A:
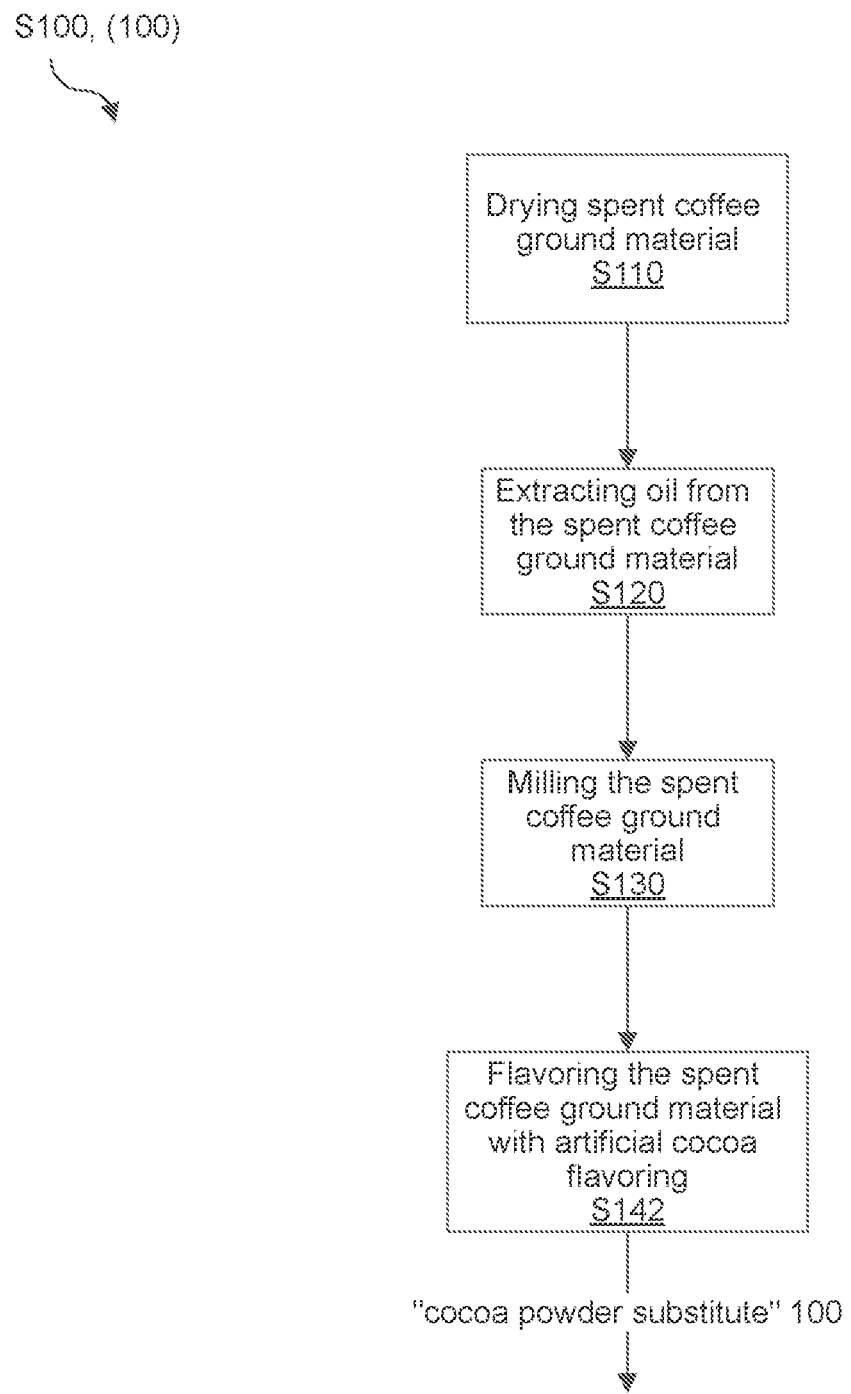
FIG. 3A is a flowchart representation of one variation of the method for producing the cocoa powder substitute, including flavoring via artificial flavor compounds.

As shown in FIG. 3A, a first variation of the method S100 for production of a cocoa powder substitute includes: drying a spent coffee ground material, previously utilized in a coffee brewing process, to a moisture content of less than 10% by mass in Step S110; extracting oil from the spent coffee ground material to achieve a fat content of the spent coffee ground material to less than 5% by mass in Step S120; milling the spent coffee ground material to an average particle size of less than 250 microns in Step S130; and flavoring the spent coffee ground material with artificial cocoa flavoring in Step S142.

Figure 3B:
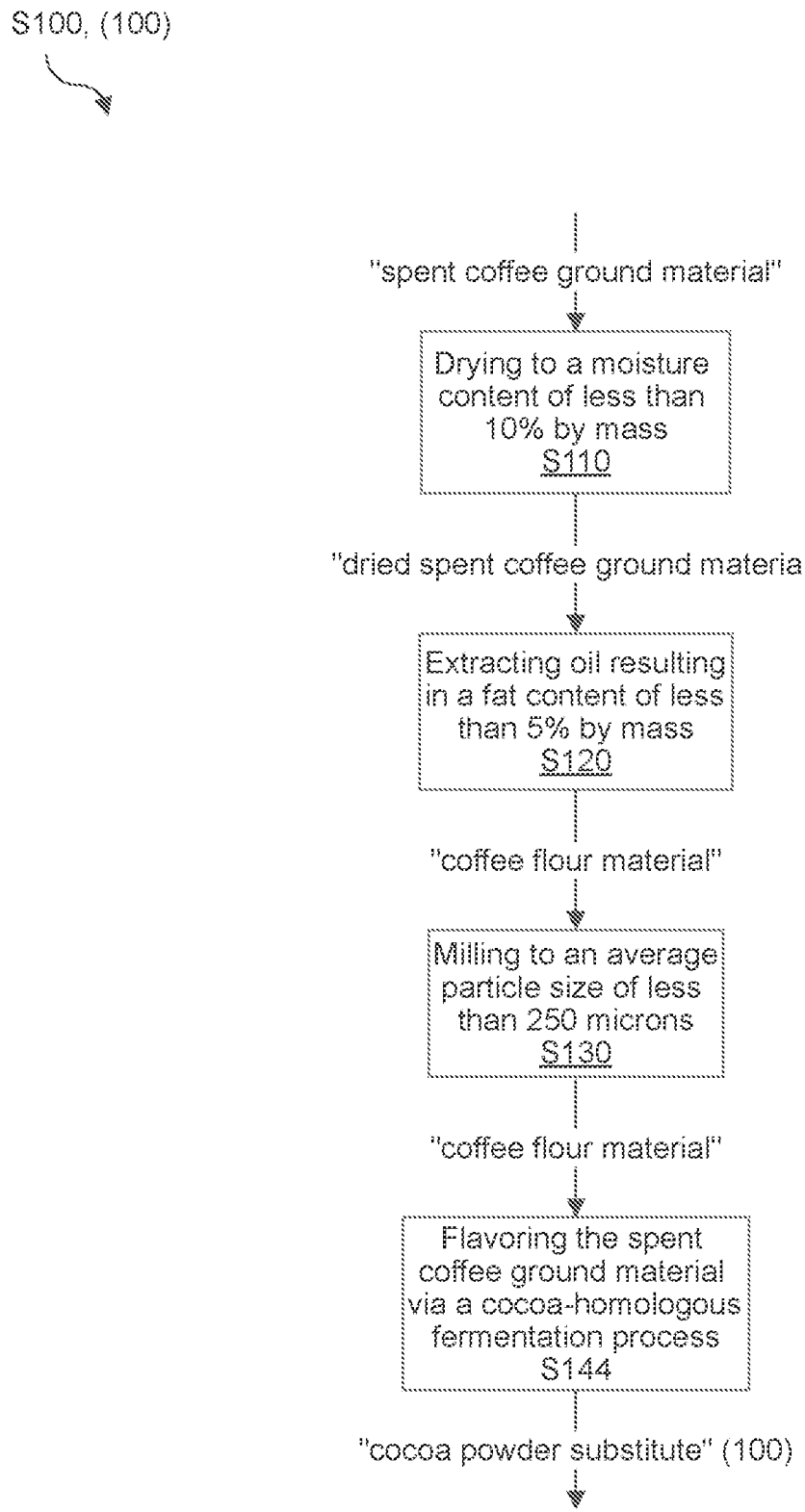
FIG. 3B is a flowchart representation of one variation of the method for producing the cocoa powder substitute including flavoring via a cocoa-homologous fermentation process.

As shown in FIG. 3B, a second variation of the method S100 for production of a cocoa powder substitute includes: drying a spent coffee ground material, previously utilized in a coffee brewing process, to a moisture content of less than 10% by mass to produce a dried spent coffee ground material in Step S110; extracting oil from the dried spent coffee ground material to produce a coffee flour material characterized by a fat content of less than 5% by mass in Step S120; milling the coffee flour material to an average particle size of less than 250 microns in Step S130; and flavoring the coffee flour material via a cocoa-homologous fermentation process in Step S144. As shown in FIG. 3C, a third variation of the method for production of a cocoa powder substitute includes: drying a spent coffee ground material, previously utilized in a coffee brewing process, to a moisture content of less than 10% by mass to produce a dried spent coffee ground material in Step S110; extracting oil from the dried spent coffee ground material to produce a coffee flour material characterized by a fat content of less than 5% by mass in Step S120; milling the coffee flour material to an average particle size of less than 250 microns in Step S130. This variation of the method S100 also includes flavoring the coffee flour material via a cocoa-homologous fermentation process by: fermenting the coffee flour material utilizing cocoa-homologous fermentation conditions to produce a fermented coffee flour material in Step S144; and roasting the fermented coffee flour material to generate Maillard reaction products in the fermented coffee flour material in Step S150.

Figure 4:
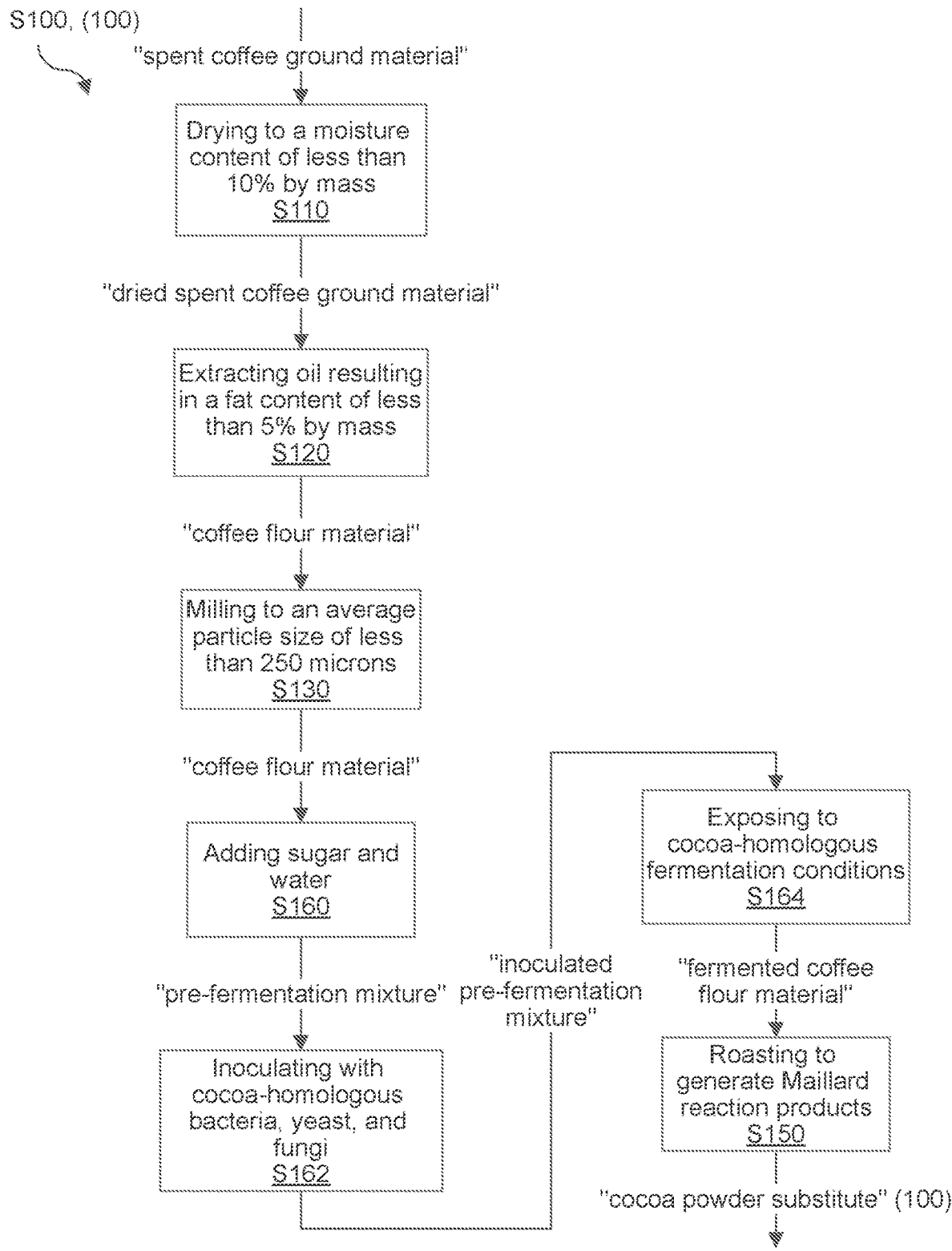
FIG. 4 is a flowchart representation of one variation of the method for producing the cocoa powder substitute including flavoring via the cocoa-homologous fermentation process including further steps of mixing, inoculation, and fermentation.

As shown in FIG. 4, a fourth variation of the method for production of a cocoa powder substitute includes: drying a spent coffee ground material, previously utilized in a coffee brewing process, to produce a dried spent coffee ground material characterized by a first moisture content of less than 10% by mass in Step S110; extracting oil from the dried spent coffee ground material to produce a coffee flour material characterized by a fat content of less than 5% by mass in Step S120; milling the coffee flour material to an average particle size of less than 250 microns in Step S130. This variation of the method S100 also includes flavoring the coffee flour material via a cocoa-homologous fermentation process by: adding a sugar and water to the coffee flour material to produce a pre-fermentation mixture characterized by a second moisture content between 5% and 20% in Step S160; inoculating the pre-fermentation mixture with a cocoa-homologous yeast, a cocoa-homologous fungus, and a cocoa-homologous bacteria to produce an inoculated pre-fermentation mixture in Step S162; exposing the inoculated pre-fermentation mixture to cocoa-homologous fermentation conditions to produce a fermented coffee flour material in Step S164; and roasting the fermented coffee flour material to generate Maillard reaction products in the fermented coffee flour material in Step S150.

3. Applications

Generally, a cocoa powder substitute 100 is produced by a system configured to execute the method S100 on a feedstock of spent coffee grounds (i.e., used or previously brewed coffee grounds) to effectively replicate the taste and physical characteristics of cocoa powder while being characterized by reduced environmental impacts and greater feedstock availability than genuine cocoa powder. By diverting coffee waste from composting centers and/or landfills, the method S100 accesses an abundant and underutilized feedstock in replacement of the emissions-intensive (i.e., carbon dioxide emissions) and logistically-fraught production process of genuine cocoa powder. The method S100 leverages the biochemical similarities between coffee beans and cocoa beans to develop a similar distribution of flavor compounds within the cocoa powder substitute 100 to those found in genuine cocoa powder resulting in a qualitatively similar flavor profile. Additionally, the cocoa powder substitute 100 is characterized by similar physical properties to genuine cocoa powder and therefore behaves similarly when introduced to water and milk, enabling its inclusion in a similar set of food products. Thus, the cocoa powder substitute 100 represents a viable substitute for genuine cocoa powder characterized by a lower carbon footprint than genuine cocoa powder and greater supply chain resiliency.

More specifically, the method S100 includes transforming the spent coffee ground feedstock into a coffee flour via drying, oil extraction, and milling. This coffee flour is characterized by low levels of coffee-associated flavor compounds and provides a flavor-neutral substrate for adding cocoa-associated flavor. The method S100 develops cocoa flavor within the coffee flour either via the addition of synthetic flavor compounds and/or via a cocoa-homologous fermentation process. Furthermore, the method S100 can include an additional roasting step to generate Maillard reaction products like those found in cocoa powder within the cocoa powder substitute 100.

Due to the high degree of similarity between the cocoa powder substitute 100 and genuine cocoa powder in taste, chemical characteristics, and physical characteristics, the cocoa powder substitute can be incorporated into many cocoa products to either reduce or eliminate the need for genuine cocoa powder in these products. For example, the cocoa powder substitute can be incorporated into hot chocolate mixes, chocolate candy, chocolate cake mixes, chocolate-based sauces, or any other chocolate- or cocoa-flavored food product.

Additionally, the cocoa powder substitute 100 is characterized by a heavy metals content less than genuine cocoa powder. For example, in one implementation, the cocoa powder substitute 100 is characterized by a cadmium content of less than 0.02 parts-per-million and a lead content of less than 0.10 parts-per-million. In contrast, genuine cocoa powder can be characterized by a lead content of up to 32.5 parts-per-million and a cadmium content of up to 2730 parts-per-million. Thus, the cocoa powder substitute 100 can represent a healthier alternative to genuine cocoa powder by including a lower concentration of lead and cadmium.

In one implementation, the method S100 includes oil extraction via supercritical carbon dioxide, which reduces residual solvent within the resulting coffee flour and facilitates regeneration of the solvent from the extracted unrefined coffee oil, thereby improving the flavor of the cocoa powder substitute 100 and reducing emissions associated with the method S100.

In another implementation, the method S100 includes flavoring via a cocoa-homologous fermentation process in which the microbiome and fermentation conditions present in cocoa food processing are instead applied to the coffee flour intermediate, thereby naturally replicating cocoa flavor compounds without relying on synthetic flavoring.

4. Cocoa Powder Substitute

Generally, the cocoa powder substitute 100 includes spent coffee grounds previously utilized in a coffee brewing process; dried to a moisture content of less than 10% by mass; defatted to a fat content of less than 5% by mass; and characterized by an average particle size of less than 250 microns. Additionally or alternatively, the cocoa powder substitute 100 can be characterized by a protein content of greater than 14% by mass and a dietary fiber content of greater than 25% by mass. Furthermore, the cocoa powder substitute 100 includes cocoa flavor compounds (i.e., aroma compounds) that are homologous or perceptively similar to those found in genuine cocoa powder, which can include procyanidins, epicatechin, catechin, pyrazines, and aldehydes esters such as: 2-furfural; benzonitrile; methyl cinnamate; 2-methylbutanal; 3-methylbutanal; 2-acetylpyrrole; 2-heptanol; 4-methyl-2-phenyl-2-pentenal; 5,6-dihydro-6-pentyl-2-pyrone; dihydro-3-hydroxy-4, 4-dimethyl-2-furanone, δ-octenolactone; 2-methylpropionic acid; benzyl-acetate; geraniol; furaneol; 2-pentanone; 1-hexanol; n-hexanal; α-terpenyl formate; 2-phenyl acetaldehyde; cinnamic acid; 2-methylpyrazine; 2,6-dimethylpyrazine; 2,3-diethylpyrazine; ethyl acetate; 5-(1-hydrohyethyl)-2-furanone; maltol; and 2-furfuryl propionate. Thus, the cocoa powder substitute 100 can include homologous chemical compounds to those found in genuine cocoa powder without relying on cocoa beans as a feedstock.

In one implementation, the cocoa powder substitute 100 can be derived from spent coffee ground feedstocks, including grounds from *Arabica* coffee beans. In another implementation, the cocoa powder substitute 100 can be derived from spent coffee ground feedstocks, including coffee grounds from *Robusta* coffee beans. In yet another implementation, the cocoa powder substitute 100 can be derived from spent coffee ground feedstocks, including grounds from both *Arabica* and *Robusta* coffee beans. Thus, the cocoa powder substitute can be derived from any combination of *Arabica* or *Robusta* coffee grounds.

The cocoa powder substitute 100 can be derived from spent coffee ground feedstocks that include a variety of particle sizes, such as steeped coffee grounds with an average (or median) particle size of 600-1000 microns or espresso coffee grounds with an average (or median) particle size of less than 300 microns. Additionally, the cocoa powder substitute 100 can be derived from spent coffee grounds produced as waste from any coffee brewing process. Thus, the cocoa powder substitute 100 is resilient to variations in the availability of various coffee ground waste products.

5. Production System

Figure 6A:
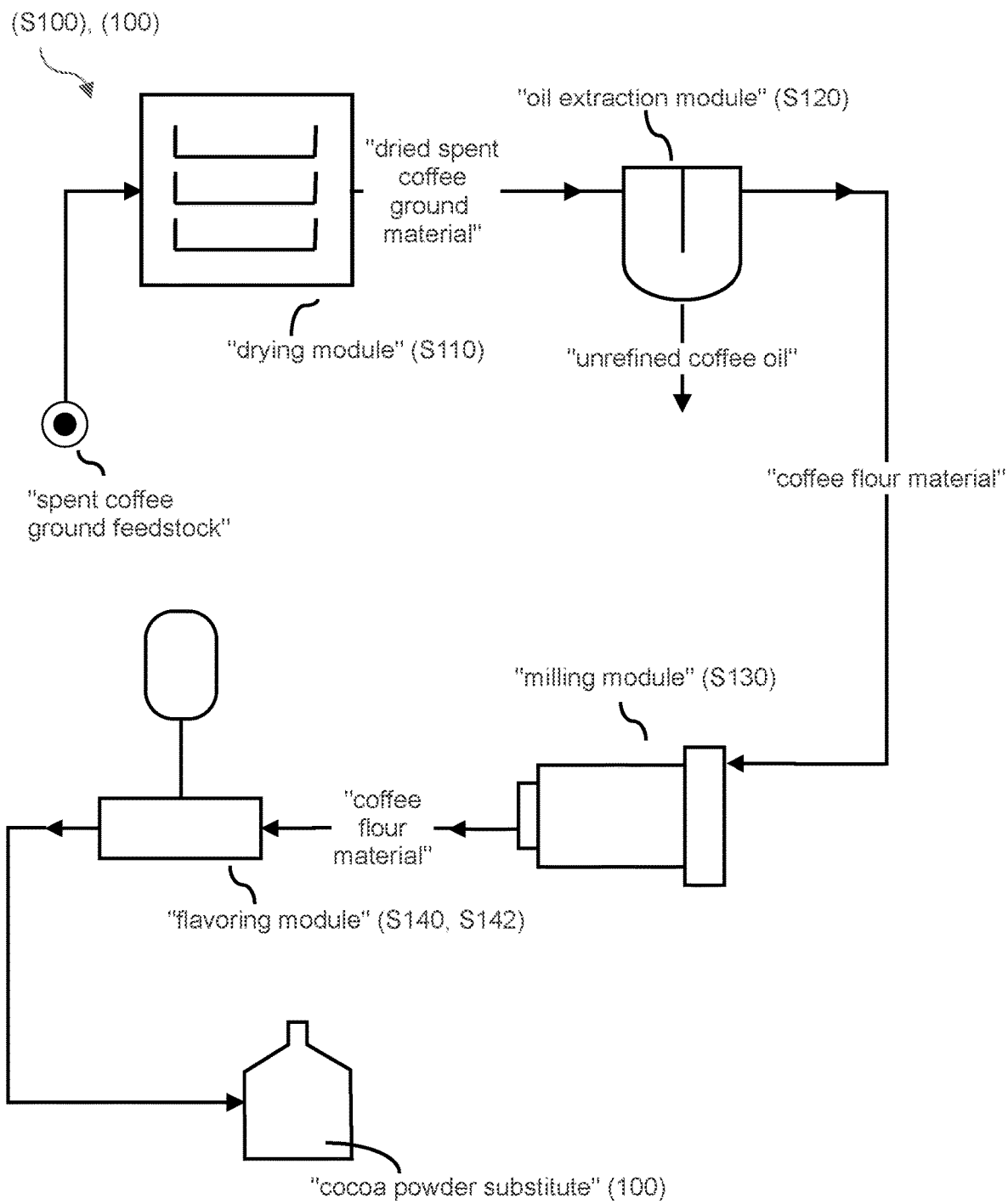
FIG. 6A is a schematic representation of one variation of a processing system for producing the cocoa powder substitute.
Figure 6B:
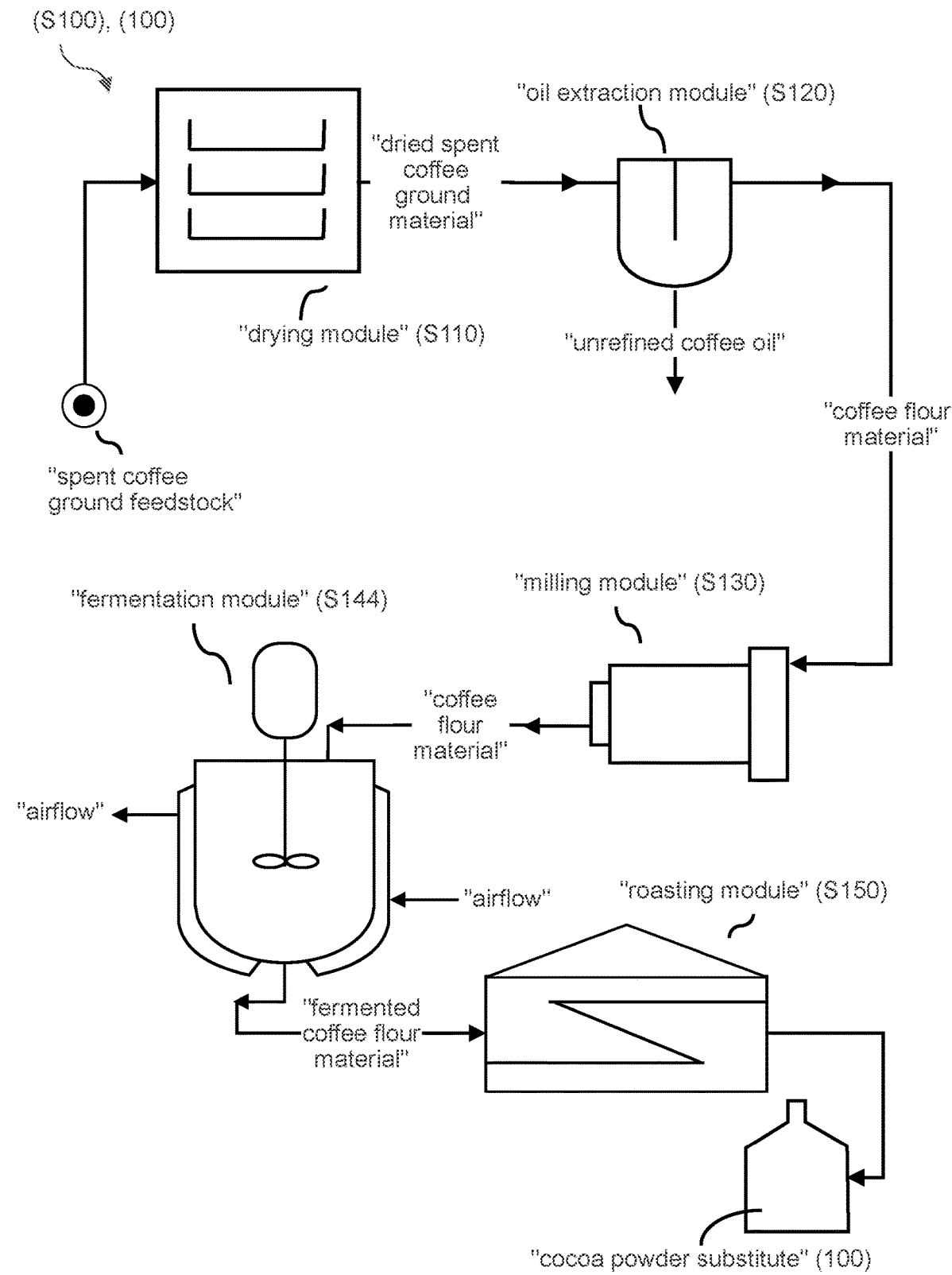
FIG. 6B is a schematic representation of one variation of the processing system for producing the cocoa powder substitute.

Generally, the method S100 is executed by a production system, as shown in FIGS. 6A and 6B. More specifically, the production system can include a set of processing modules, wherein each processing module is configured to execute a Step in the method S100 further described below. Additionally, the production system can include processing modules configured for a continuous production process, batch production process, or a combination of both production processes. For example, the production system can execute a continuous production process prior to fermentation step S144 and a batch process thereafter. Furthermore, the production system can include a control subsystem executing software configured to perform the individual steps of the method S100 via the set of processing modules and to coordinate transfer of an intermediate of the cocoa powder substitute 100 between processing modules according to the method S100.

Processing modules corresponding to each step in the method S100 are described in further detail below with reference to each step in the method S100. FIGS. 6A and 6B represent one implementation of the processing system. However, modules of the processing system can be arranged in accordance with the order of Steps in the method S100 and can vary from the implementation shown in FIGS. 6A and 6B. For example, the milling module can be positioned before the oil extraction module. Furthermore, the processing system can include a conveyor system or other mode of transference to move intermediates of the cocoa powder substitute from one module to another within either a batch or a continuous implementation of the method S100.

In one implementation, shown in FIG. 6A, the processing system includes a drying module, an oil extraction module, a milling module, and a flavoring module. In another implementation, shown in FIG. 6B, the processing system includes a drying module, an oil extraction module, a milling module, a fermentation module, and a roasting module.

The processing system can include a drying module such as a convective drying unit, a conductive drying unit, a radiative drying (i.e., infrared) unit, a microwave drying unit, a vacuum centrifuge and/or a fluidized bed drying unit. Thus, the processing system includes a drying module configured to reduce the moisture content of the spent coffee grounds to less than 10% by mass in Step S110.

The processing system can include an oil extraction module such as a supercritical carbon dioxide extractor, a supercritical carbon dioxide extractor configured to utilize ethanol as a cosolvent, a liquid solvent extractor, or an ultrasound-assisted liquid solvent extractor. In one implementation, the processing system can include an ethanol washing unit configured to remove extraneous solvent from the intermediate of the cocoa powder substitute 100. Thus, the processing system includes an oil extraction module configured to reduce the fat content of the spent coffee grounds to less than 5% by mass in Step S120.

The processing system can include a milling module such as a roller mill, a hammer mill, a ball mill, a disc mill, or a combination thereof. Thus, the processing system can include a milling module configured to reduce the average (or median) particle size of the intermediate of the cocoa powder substitute 100 to less than 250 microns.

The processing system can include a flavor module such as a powder mixing unit to incorporate a synthetic flavoring into an intermediate of the cocoa powder substitute 100. The powder mixing unit can include a drum mixer, a vertical twin-shaft mixer, or any other food-grade mixer. Thus, the processing system is configured to add a synthetic flavor additive to an intermediate of the cocoa powder substitute 100.

The processing system can include a fermentation module such as an industrial bioreactor or fermentation unit. Additionally, the fermentation module can include a pre-fermentation mixer configured to incorporate additional moisture, sugar, or other ingredients into the pre-fermentation mixture. Thus, the processing system can include a fermentation module configured to produce a pre-fermentation mixture and to apply fermentation conditions to the pre-fermentation mixture during Step S144 of the method S100.

The processing system can include a roasting module such as a batch roaster or continuous roaster. In one example, the roasting module includes a conductive roaster, a convective roaster, and/or a radiative roaster. Thus, the processing system includes a roasting module configured to initiate Maillard reactions in the fermented coffee flour mixture by roasting the fermented coffee flour mixture at a temperature between 200 degrees Fahrenheit and 300 degrees Fahrenheit.

6. Production Process

The method S100 is a production process for the cocoa powder alternative 100. More specifically, the method S100 includes a drying Step S110, an oil extraction Step S120, a milling Step S130, and a flavoring step S140. In some implementations, the flavoring Step S140 further includes flavoring the spent coffee ground material via synthetic flavors in Step S142. In another implementation, the method S100 further includes fermenting and roasting the spent coffee grounds in Step S144. Thus, the method S100 transforms the spent coffee ground feedstock into the cocoa powder substitute 100.

6.1 Spent Coffee Grounds

Generally, the method S100 includes procuring a spent coffee ground feedstock for input to the production system and processing according to subsequent Steps of the method S100. More specifically, the method S100 can include procuring spent coffee grounds of either the *Arabica* or *Robusta* varieties and from any brewing process. For example, the method S100 can include procuring coffee grounds from industrial steep brewing processes or from small-scale espresso brewing processes. Thus, although the exact taste and/or texture of implementations of the cocoa powder substitute can vary depending on the specific varietal distribution of spent coffee grounds used as a feedstock, the method S100 is robust to variation in the spent coffee ground feedstock.

6.2 Drying

Generally, the method S100 includes drying the spent coffee ground material to improve the stability of the material and reduce the probability of microbial growth within the dried spent coffee ground material prior to further processing. More specifically, the method S100 includes drying a spent coffee ground material, previously utilized in a coffee brewing process, to a moisture content of less than 10% by mass via the drying module in Step S110. Additionally, the method S100 can include drying the spent coffee ground material to a moisture content of less than 8% by mass to further increase the stability of the dried spent coffee grounds. The method S100 can include any food-safe drying process suitable for drying powdered products. Several implementations are further described below.

In one implementation, the method S100 can include drying the spent coffee grounds to a moisture content of less than 10% by mass via a microwave drying process executed by a microwave drying unit. This implementation of the method S100 provides several advantages, including a lack of contact between a heating surface and the spent coffee grounds, even heat distribution throughout the spent coffee ground sample, and energy efficiency relative to other drying options. Additionally, the method S100 can include drying the spent coffee grounds to a moisture content of less than 10% by mass via a combination of microwave drying and one or more other drying process.

In another implementation, the method S100 can include drying the spent coffee grounds to a moisture content of less than 10% by mass via a convective air drying process executed by a convective drying unit. This implementation provides advantages by including the prevention of scorching due to electromagnetic field variations in the case of microwave drying or due to contact with a heat-conductive surface in a conduction-based drying process. Furthermore, the implementation of convective air drying is better understood on an industrial scale. Additionally, the method S100 can include drying the spent coffee grounds to a moisture content of less than 10% by mass via a combination of convective air drying and one or more other drying processes.

In additional implementations, the method S100 can include drying the spent coffee grounds to a moisture content of less than 10% by mass via a conductive or radiative (i.e., infrared) drying process executed by a conductive or radiative drying unit. These implementations provide advantages in hardware simplicity and lower capital costs but can require physical agitation of the spent coffee grounds in order to prevent uneven heating at the surface of the spent coffee ground sample. Additionally, the method S100 can include drying the spent coffee grounds to a moisture content of less than 10% by mass via a combination of conductive or radiative drying processes and one or more other drying processes.

In yet another implementation, the method S100 can include drying the spent coffee grounds to a moisture content of less than 10% by mass via a vacuum drying process executed by a vacuum drying unit. In one example of this implementation, the vacuum drying process is executed by a vacuum centrifuge drying unit. This implementation provides advantages by preventing heat-related damage to the spent coffee grounds (e.g., such as localized scorching or exceeding the flashpoint of the coffee oils with the spent coffee grounds. Additionally, the method S100 can include drying the spent coffee grounds to a moisture content of less than 10% by mass via a combination of vacuum drying processes and one or more other drying processes.

6.3 Oil Extraction

Generally, the method S100 includes extracting oil from the dried spent coffee ground material to reduce the quantity of coffee-specific triglycerides retained in the dried spent coffee grounds, which may otherwise cause the dried spent coffee grounds to retain a coffee-like flavor. More specifically, the method S100 includes extracting oil from the spent coffee ground material to reduce a fat content of the spent coffee ground material to less than 5% by mass via the oil extraction module in Step S120. Thus, by extracting coffee oils from the dried spent coffee ground material, the method S100 strips residual coffee flavor from the dried spent coffee grounds, thereby enabling subsequent Steps of the method S100 to effectively re-flavor the coffee flour material to produce the cocoa powder substitute 100 characterized by a flavor resembling genuine cocoa powder. Additionally, the oil extraction Step S120 prevents coffee oil migration into final products (e.g., confectionaries) incorporating the cocoa powder substitute 100.

During the extraction process, the method S100 also produces unrefined coffee oil as a byproduct that may be utilized as a feedstock for additional coffee-based products. More specifically, the method S100 can include extracting oil from the dried spent coffee ground material to produce a coffee flour material characterized by a fat content of less than 5% by mass and an unrefined coffee oil.

The method S100 can include an oil extraction process utilizing any combination of food-grade organic solvents such as ethanol, isopropanol, butanol, hexane, heptane, and acetone. Additionally or alternatively, the method S100 can include an oil extraction process utilizing supercritical carbon dioxide extraction. These implementations are described in further detail below.

In one implementation, the method S100 includes utilizing supercritical carbon dioxide extraction to defat the dried spent coffee ground material. More specifically, the method S100 can include extracting oil from the dried spent coffee ground material via supercritical carbon dioxide extraction to produce the coffee flour material characterized by a fat content of less than 5% by mass. This implementation provides advantages including a reduction in residual solvent in the resulting coffee flour material and superior penetration into a given volume of dried spent coffee ground material. Thus, implementations of the method S100, including supercritical carbon dioxide extraction, can improve the flavor of the resulting cocoa powder substitute.

One example of an implementation of the method S100, including oil extraction via supercritical carbon dioxide extraction, further includes: depositing the dried spent coffee ground material within an extraction cell; pumping supercritical carbon dioxide into the extraction cell at a carbon dioxide pressure between 4,500 psi and 10,000 psi, a carbon dioxide flow rate of between 1,250 pounds-per-hour and 3,250 pounds-per-hour, and a carbon dioxide temperature between 135 degrees Fahrenheit and 185 degrees Fahrenheit. This example of the method S100 enables increased yield by removing up to 15% of the mass of the dried coffee ground material in oil.

Another example of an implementation of the method S100 including oil extraction via supercritical carbon dioxide includes extracting oil from the dried spent coffee ground material via supercritical carbon dioxide extraction with ethanol as a cosolvent to produce the coffee flour material. Alternatively, the method S100 can include a separate step of washing the coffee flour material with ethanol subsequent to oil extraction via supercritical carbon dioxide. Thus, in this implementation, the additional step of ethanol washing reduces coffee-related bitterness in the resulting coffee flour.

6.3.1 Unrefined Coffee Oil

Generally, the method S100 produces an unrefined coffee oil as a byproduct of the oil extraction Step S120. In some applications of the method S100, Step S120 produces unrefined coffee oil that can be incorporated into other consumer products, such as soaps or detergents, candles, cosmetics, or coffee-flavored foods. Additionally, the method S100 can produce unrefined coffee oil that can be utilized as a substitute for palm oil, sunflower oil, and animal fat. Thus, the method S100 produces a beneficial coffee oil byproduct in addition to the cocoa powder substitute 100.

6.4 Milling

Generally, the method S100 includes milling the spent coffee ground material, coffee flour material, or any intermediate of the cocoa powder substitute 100 to reduce the average particle size distribution of the spent coffee ground material, coffee flour material, or an intermediate of the cocoa powder substitute 100. More specifically, the method S100 can include milling the spent coffee ground material to an average particle size of less than 250 microns via the milling module in Step S130. Thus, the method S100 reduces the particle size of the spent coffee ground material from 300 microns or greater on average to less than 250 microns to improve the resemblance of the cocoa powder substitute 100 to genuine cocoa powder, which is generally characterized by an average particle size of less than 250 microns.

Implementations of the method S100 can include the milling step at any timing relative to the other Steps of the method S100. Each of these timings is described in further detail below.

Figure 5A:
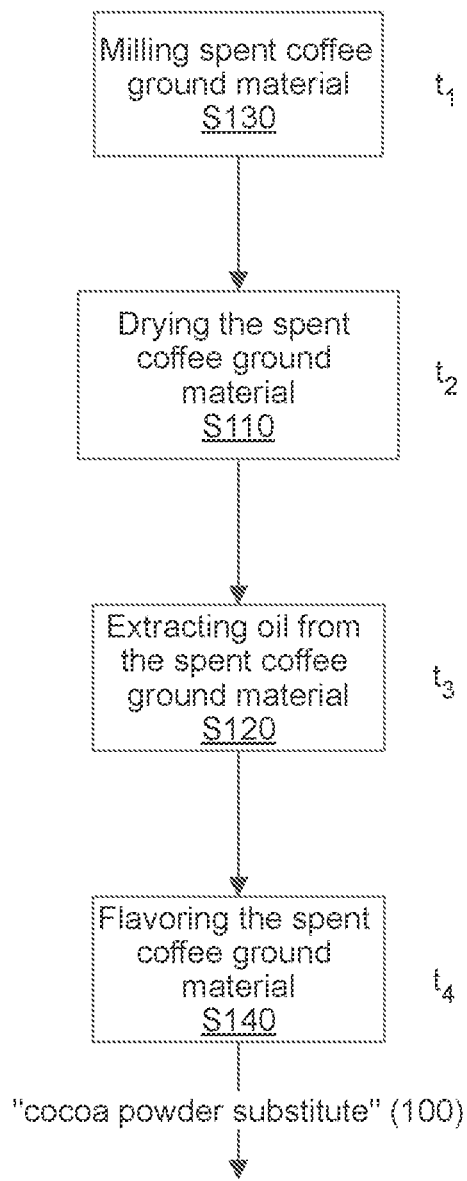
FIG. 5A is a flowchart representation of one variation of the method for producing the cocoa powder substitute including a first timing of a milling step.

As shown in FIG. 5A, the method S100 can include milling the spent coffee ground material to an average particle size of less than 250 microns prior to Step S110 of drying the spent coffee ground material. In this implementation, the method S100 reduces the particle size of the spent coffee ground material prior to drying to improve the efficiency of the drying process.

Figure 5B:
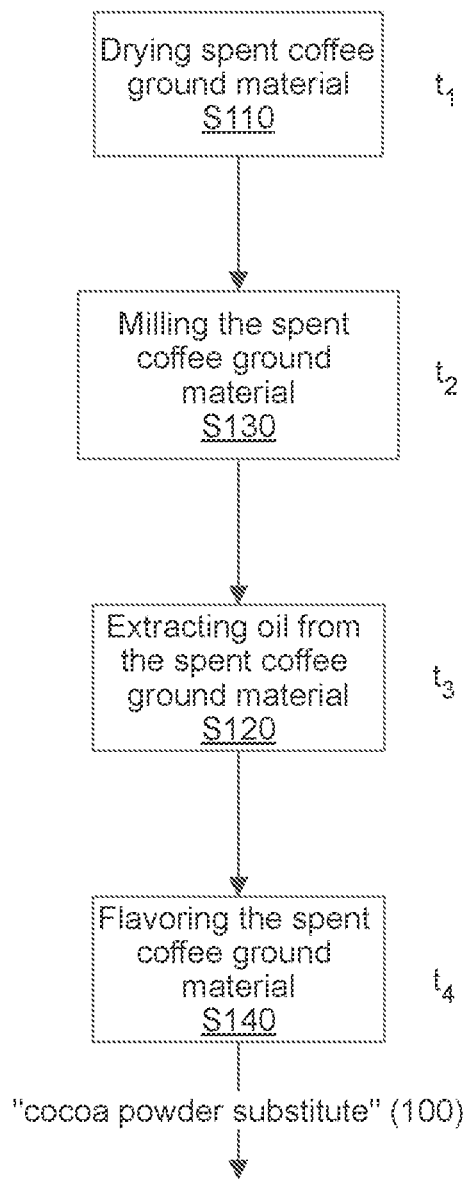
FIG. 5B is a flowchart representation of one variation of the method for producing the cocoa powder substitute including a second timing of a milling step.

As shown in FIG. 5B, the method S100 can include milling the spent coffee ground material to an average particle size of less than 250 microns prior to Step S120 of extracting oil from the spent coffee ground material. In this implementation, the method S100 reduces the particle size of the spent coffee ground material prior to oil extraction to improve penetration of the organic solvents utilized in Step S130 into the bulk spent coffee ground material.

Figure 5C:
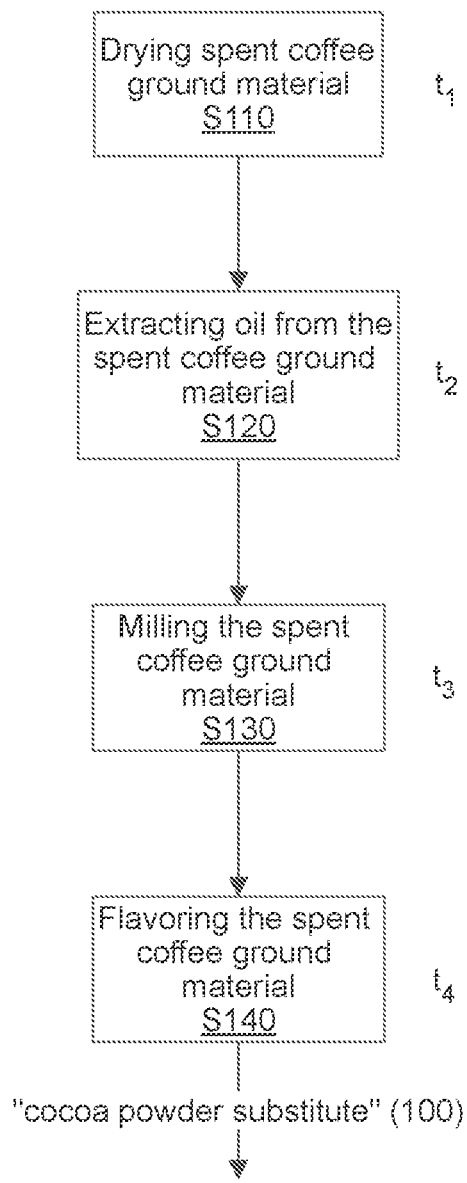
FIG. 5C is a flowchart representation of one variation of the method for producing the cocoa powder substitute including a third timing of a milling step.

As shown in FIG. 5C, the method S100 can include milling the coffee flour material to the average particle size of less than 250 microns prior to flavoring Step S140 or prior to fermentation step S144. In this implementation, the method S100 reduces the particle size of the coffee flour material prior to mixing of the coffee flour material with synthetic flavoring or pre-fermentation additives.

Figure 5D:
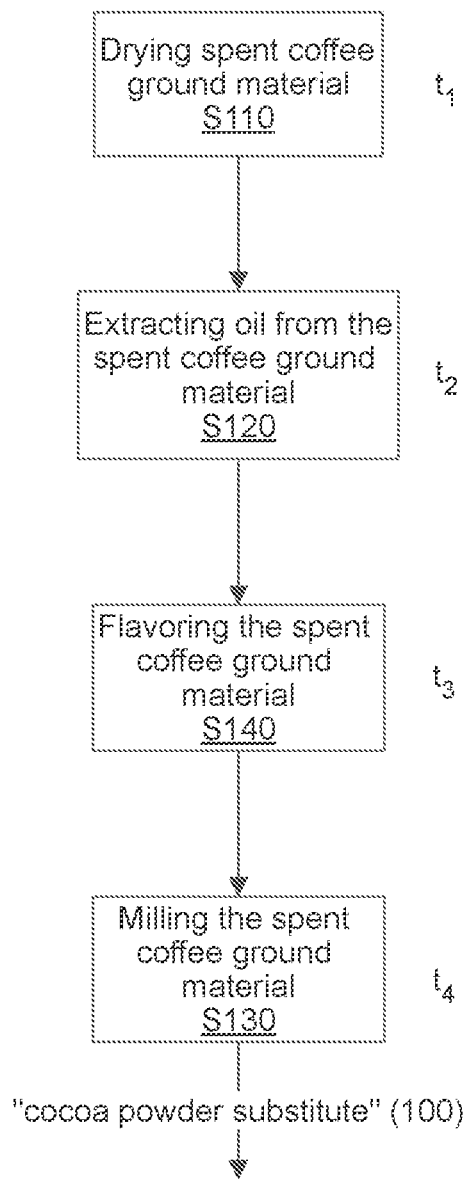
FIG. 5D is a flowchart representation of one variation of the method for producing the cocoa powder substitute including a fourth timing of a milling step.

As shown in FIG. 5D, the method S100 can include milling the fermented coffee flour to the average particle size of less than 250 microns after flavoring Step S140 or after fermentation Step S144. In this implementation, the method S100 modifies the particle size to less that 250 microns to enable easy incorporation into products or confections that typically incorporate genuine cocoa powder.

7. Flavoring

Generally, the method S100 includes flavoring the coffee flour material to cultivate a flavor substantially similar to cocoa within the cocoa powder substitute 100. More specifically, the method S100 includes flavoring the spent coffee ground material to produce a cocoa-homologous flavor in the spent coffee ground material in Step S140. In one implementation, the method S100 includes adding artificial flavoring (i.e., flavoring not derived from genuine cocoa) to flavor the coffee flour material. In another implementation, the method S100 includes flavoring the coffee flour material via a cocoa-homologous fermentation and/or roasting process. Each of these implementations is described in further detail below.

7.1 Artificial Flavoring

In one variation, the method S100 includes flavoring the spent coffee ground material with artificial cocoa flavoring in Step S142. In this implementation, the method S100 is characterized by reduced processing costs as the artificially derived flavoring can be incorporated directly via mixing. Additionally, the method S100 can include flavoring the spent coffee ground material with artificial cocoa flavoring not derived from cocoa sources. Thus, this variation of the method S100 remains independent of the cocoa-supply chain.

The method S100 can include flavoring the spent coffee ground material with artificial cocoa flavoring that replicates cocoa flavor compounds via chemical synthesis as opposed to natural extraction from cocoa-derived material. The method S100 can achieve a variety of cocoa-homologous flavors via mixing of artificial flavor compounds directly with the coffee flour material. The method S100 can include mixing via any type of industrial food mixer based on the physical characteristics of the flavoring relative to the coffee flour material (i.e., via the powder mixing unit). For example, the method S100 can include mixing the artificial cocoa flavoring with the coffee flour material via powder-powder mixers (e.g., ribbon mixers, high shear mixers, planetary mixers, vertical blenders) or powder-liquid mixers (e.g., tumble blenders, ribbon mixers, high shear mixers, planetary mixers, vertical blenders). Thus, the method S100 includes evenly distributing the artificial flavoring with the coffee flour material to produce the cocoa powder substitute.

7.2 Fermentation Process

One variation of the method S100 includes cultivating a cocoa-homologous flavor within the coffee flour material by utilizing an industrial fermentation process that replicates the fermentation process of cocoa beans. More specifically, the method S100 can include flavoring the coffee flour material via a cocoa-homologous fermentation process executed by the fermentation module in Step S144. This variation of the method S100 creates a cocoa-homologous flavor profile by producing a distribution of flavor compounds within the coffee flour similar to those found in cocoa powder via a natural bioreaction. Thus, this variation of the method S100 enables the development of natural cocoa flavor within the coffee flour substrate that may be difficult to distinguish from genuine cocoa powder.

In one implementation, the method S100 includes fermenting the coffee flour material utilizing cocoa-homologous fermentation conditions to produce a fermented coffee flour material. Thus, the method S100 can include a fermentation process that mimics conditions such as pH, temperature, and airflow present during a genuine cocoa fermentation process. This implementation is described in further detail below.

In another implementation, the method S100 includes: adding sugar and water to the coffee flour material to produce a pre-fermentation mixture characterized by a second moisture content between 5% and 20%; inoculating the pre-fermentation mixture with a cocoa-homologous yeast, a cocoa-homologous fungus, and a cocoa-homologous bacteria to produce an inoculated pre-fermentation mixture; and exposing the inoculated pre-fermentation mixture to cocoa-homologous fermentation conditions to produce the fermented coffee flour material. Thus, the method S100 can cultivate a cocoa-homologous bioreactive environment within the fermentation module by matching sugar and water content within a pre-fermentation mixture, matching the microbial profile within the fermentation module, and matching fermentation conditions to those present in cocoa food processing. This implementation is also described in further detail below.

In yet another implementation, the method S100 includes a roasting step to induce a Maillard reaction to transform fermentation products with the fermented coffee flour material into Maillard reaction products resembling cocoa flavor compounds. Like the fermentation step, the roasting step of the method S100 approximates the conditions of cocoa roasting processes. This implementation is described in further detail below.

7.2.1 Pre-Fermentation Mixture

Generally, prior to cocoa-homologous fermentation, the method S100 includes creating a pre-fermentation mixture by adding sugar and additional moisture to the coffee flour material to provide a suitable substrate for industrial fermentation. More specifically, the method S100 includes adding sugar and water to the coffee flour material to produce a pre-fermentation mixture characterized by a second moisture content between 5% and 20% in Step S160. Thus, the method S100 includes a preparation step to enable fermentation in the coffee flour, which is low in sugar and moisture after having been dried for shelf stability purposes in Step S110.

In one implementation, the method S100 includes adding sucrose to the pre-fermentation mixture as the primary sugar for the fermentation process. More specifically, the method S100 includes adding sucrose and water to the coffee flour material to produce the pre-fermentation mixture characterized by the second moisture content between 5% and 20%. Thus, the method S100 includes utilizing sucrose as the primary sugar in fermentation.

7.2.2 Inoculation

Generally, the method S100 can also include inoculating the pre-fermentation mixture with a cocoa-homologous microbial combination to produce a similar set of post-fermentation flavor compounds to those found in genuine cocoa powder. More specifically, the method S100 can include inoculating the pre-fermentation mixture with a cocoa-homologous yeast, a cocoa-homologous fungus, and a cocoa-homologous bacteria to produce an inoculated pre-fermentation mixture in Step S162. Additionally, the method S100 can include inoculating the pre-fermentation mixture with additional cocoa-homologous yeasts, cocoa-homologous fungi, or cocoa-homologous bacteria. Alternatively, the method S100 can include inoculating the pre-fermentation mixture with the cocoa-homologous yeast present in a cocoa fermentation process, the cocoa-homologous fungus present in the cocoa fermentation process, and a cocoa-homologous bacteria present in the cocoa fermentation process. Thus, the method S100 can generate a subset of cocoa flavor compounds without cocoa beans.

In one implementation, the method S100 can include inoculating the pre-fermentation mixture with a cocoa-homologous yeast such as *Saccharomyces cerevisiae*, *Kloeckera apis*, and/or *Candida krusei*. Additionally or alternatively, the method S100 can include inoculating the pre-fermentation mixture with other cocoa-homologous fungi such as fungi of the genus *geotrichum*. In this implementation, the method S100 can include inoculation by any microbe that is commonly present within a cocoa fermentation process in order to replicate cocoa flavor compounds within the coffee flour.

In another implementation, the method S100 includes inoculating the pre-fermentation mixture with both cocoa-homologous lactic acid bacteria and a cocoa-homologous acetic acid bacteria. More specifically, the method S100 can include inoculating the pre-fermentation mixture with the cocoa-homologous yeast, the cocoa-homologous fungus, a cocoa-homologous lactic acid bacteria, and a cocoa-homologous acetic acid bacteria to produce an inoculated pre-fermentation mixture. In this implementation, the method S100 can include inoculating the pre-fermentation mixture with lactic acid bacteria such as *Lactobacillus cellobiosus* and/or *Lactobacillus plantarum*. Additionally, the method S100 can include inoculating the pre-fermentation mixture with n acetic acid bacteria such as *Acetobacter aceti* and *Gluconobacter oxydans*. Thus, the method S100 can produce an inoculated pre-fermentation mixture capable of producing a cocoa-homologous fermentation environment when exposed to a set of fermentation conditions favorable for the microbes present in the pre-fermentation mixture.

7.2.2 Fermentation Conditions

Generally, the method S100 can include introducing the inoculated pre-fermentation mixture to an industrial bioreactor of fermentation unit capable of maintaining temperature and airflow around the inoculated pre-fermentation mixture suitable for a fermentation bioreaction given the microbial environment of the inoculated pre-fermentation mixture, the sugar content of the inoculated pre-fermentation mixture, and the moisture content of the pre-fermentation mixture. More specifically, the method S100 can include exposing the inoculated pre-fermentation mixture to cocoa-homologous fermentation conditions to produce a fermented coffee flour material in Step S164. Thus, the method S100 can initialize fermentation with the inoculated pre-fermentation mixture.

In one implementation, the method S100 can include exposing the inoculated pre-fermentation mixture to an initial pH between 3.0 and 3.5; a temperature between 20 degrees Celsius and 50 degrees Celsius; and an airflow between 20 feet per minute and 40 feet per minute. In this implementation, the pH of the fermentation mixture can continue to increase up to approximately 5.0 as the bacteria in the inoculate fermentation mixture consumes the acid present in the mixture. Additionally, the temperature within the fermentation unit may fluctuate as the activity level of the microbes in the inoculated fermentation mixture changes over time. Thus, one of skill in the art can recognize that the cocoa-homologous fermentation conditions can be tuned to optimize the production of cocoa-flavor compounds or flavor compound precursors (e.g., compounds that are reactants in Maillard reactions typically present in cocoa roasting processes).

7.2.4 Roasting

Generally, upon completion of the above-described cocoa-homologous fermentation process, the method S100 can include roasting the fermented coffee flour material produced by the cocoa-homologous fermentation process to initiate Maillard reactions in the fermented coffee material. More specifically, the method S100 can include roasting the fermented coffee flour material to generate Maillard reaction products in the fermented coffee flour material in Step S150. Thus, because post-fermentation roasting is a critical step in producing distinctive cocoa flavor compounds within genuine cocoa powder, the method S100 includes a similar roasting step to produce similar flavor compounds.

In this implementation, the method S100 includes roasting the fermented coffee flour via a roasting module, including a batch or continuous roaster at a temperature between 200 degrees Fahrenheit and 300 degrees Fahrenheit. These temperatures are sufficient for inducing Maillard reactions within the fermented coffee flour, thereby flavoring the cocoa powder substitute 100.

8. Product Incorporation

Figure 7:
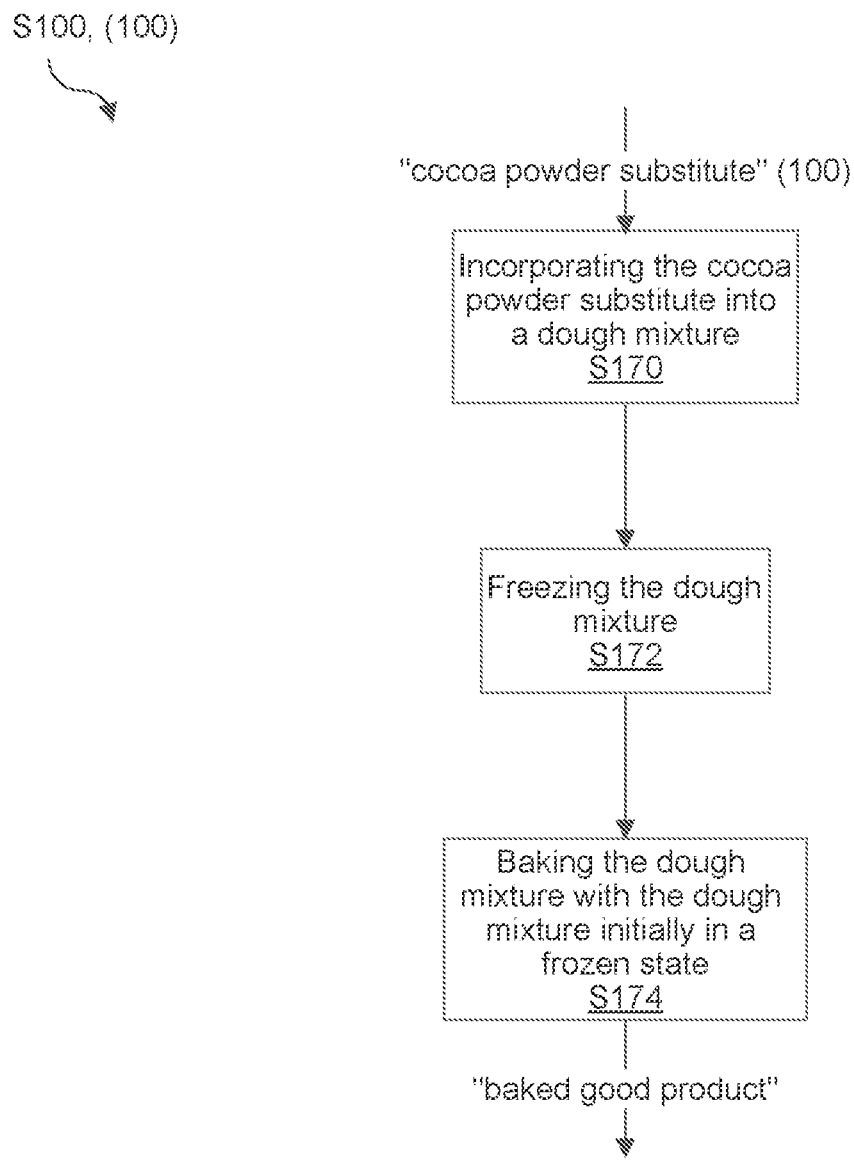
FIG. 7 is a flowchart representation of one variation of the method.

As shown in FIG. 7, one variation of the method S100 includes incorporating the cocoa powder substitute 100 into a baked good such as a cookie, a cake, a bread, or any other confectionary product. More specifically, in this variation the method S100 includes: incorporating the cocoa powder substitute 100 into a dough mixture in Step S170; freezing the dough mixture in Block S172; and baking the dough mixture, wherein the dough mixture is initially in a frozen state in Block S174. In this variation of the method S100, by freezing the dough including the cocoa powder substitute 100, any remaining bitterness is further reduced, thereby resulting in an improved taste for the final product.

Generally, the Steps S170, S172, and S174 can be executed according to an additional continuous or batch food process and by a mixing unit, a freezing unit, and a baking unit. In continuous implementation of this variation of the method S100, a conveying and/or dispensing unit can transfer the dough from the mixing unit into the freezing unit and subsequently into the baking unit. Alternatively, in a batch implementation of this variation of the method S100, the product including the cocoa powder substitute 100 can be transferred between the mixing unit, the freezing unit, and the baking unit by any other means. Additionally, freezing and baking temperatures utilized in the freezing unit and baking unit respectively can vary tempending on the specific product. Thus, the method S100 can include production of a consumable product including the cocoa powder substitute 100.

8.1 Alkalized Cocoa Powder Substitute

As shown in FIG. 8, one variation of the method S100 includes alkalizing or dutching the cocoa powder substitute 100 to produce a black cocoa powder substitute with a less bitter flavor relative to the cocoa powder substitute 100. More specifically, the method S100 can include treating the cocoa powder substitute 100 with an alkalizing agent to produce an alkalized cocoa powder substitute characterized by a pH between 7 and 8 in Step S180. This variation of the method S100 can include treating the cocoa powder substitute with alkalizing agents such as potassium carbonate, sodium carbonate, and/or sodium hydroxide. Thus, the method S100 can produce an alkalized cocoa powder substitute 100 that may be more easily incorporated into sweeter food products.

The processing system described herein can be implemented, at least in part, as a machine configured to receive a computer-readable medium storing computer-readable instructions. The instructions can be executed by computer-executable components integrated with the hardware/firmware/software elements of a computer integrated with modules of processing system described herein. The instructions can be executed by computer-executable components integrated over a network such as a local area or wide area network (e.g., the internet). The computer-readable medium can be instantiated as RAM, ROM, flash memory, EEPROM, an optical device (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for production of a cocoa powder substitute comprising:
    drying a spent coffee ground material, previously utilized in a coffee brewing process, to a moisture content of less than 10% by mass to produce a dried spent coffee ground material;
    extracting oil from the dried spent coffee ground material to produce a coffee flour material characterized by a fat content of less than 5% by mass;
    milling the coffee flour material to an average particle size of less than 250 microns; and
    flavoring the coffee flour material via a cocoa-homologous fermentation process.

2. The method of claim 1, wherein flavoring the coffee flour material via the cocoa-homologous fermentation process comprises fermenting the coffee flour material utilizing cocoa-homologous fermentation conditions to produce a fermented coffee flour material.

3. The method of claim 2, wherein flavoring the coffee flour material via the cocoa-homologous fermentation process comprises flavoring the coffee flour material utilizing cocoa-homologous fermentation conditions and roasting the fermented coffee flour material to generate Maillard reaction products in the fermented coffee flour material.

4. The method of claim 2, wherein fermenting the coffee flour material utilizing cocoa-homologous fermentation conditions to produce the fermented coffee flour material comprises:
    adding sugar and water to the coffee flour material to produce a pre-fermentation mixture characterized by a second moisture content between 5% and 20%;
    inoculating the pre-fermentation mixture with a cocoa-homologous yeast, a cocoa-homologous fungus, and a cocoa-homologous bacteria to produce an inoculated pre-fermentation mixture; and
    exposing the inoculated pre-fermentation mixture to cocoa-homologous fermentation conditions to produce the fermented coffee flour material.

5. The method of claim 4, wherein inoculating the pre-fermentation mixture comprises inoculating the pre-fermentation mixture with the cocoa-homologous yeast present in a cocoa fermentation process, the cocoa-homologous fungus present in the cocoa fermentation process, and a cocoa-homologous bacteria present in the cocoa fermentation process.

6. The method of claim 4, wherein the cocoa-homologous yeast is selected from a group comprising:
Saccharomyces cerevisiae;
Kloeckera apis; and
Candida krusei.

7. The method of claim 4, wherein the cocoa-homologous fungus comprises geotrichum.

8. The method of claim 4, wherein the inoculating the pre-fermentation mixture comprises inoculating the pre-fermentation mixture with the cocoa-homologous yeast, the cocoa-homologous fungus, a cocoa-homologous lactic acid bacteria, and a cocoa-homologous acetic acid bacteria to produce the inoculated pre-fermentation mixture.

9. The method of claim 4, wherein the cocoa-homologous bacteria is selected from a group comprising:
Lactobacillus cellobiosus;
Lactobacillus plantarum;
Acetobacter aceti; and
Gluconobacter oxydans.

10. The method of claim 4, wherein exposing the inoculated pre-fermentation mixture to cocoa-homologous fermentation conditions comprises exposing the inoculated pre-fermentation mixture to:
an initial pH between 3.0 and 3.5;
a temperature between 20 degrees Celsius and 50 degrees Celsius; and
an airflow between 20 feet per minute and 40 feet per minute.

11. The method of claim 1, wherein milling the coffee flour material to an average particle size of less than 250 microns comprises milling the coffee flour material to the average particle size of less than 250 microns after fermentation.

12. The method of claim 1, wherein extracting oil from the dried spent coffee ground material comprises extracting oil from the dried spent coffee ground material to produce:
a coffee flour material characterized by a fat content of less than 5% by mass; and
an unrefined coffee oil.

13. The method of claim 1, wherein extracting oil from the dried spent coffee ground material comprises extracting oil from the dried spent coffee ground material via supercritical carbon dioxide extraction to produce the coffee flour material characterized by the fat content of less than 5% by mass.

14. The method of claim 13, wherein extracting oil from the dried spent coffee ground material via supercritical carbon dioxide extraction comprises:
depositing the dried spent coffee ground material within an extraction cell; and
pumping supercritical carbon dioxide into the extraction cell at a carbon dioxide pressure between 4,500 psi and 10,000 psi, a carbon dioxide flow rate of between 1,250 pounds-per-hour and 3,250 pounds-per-hour, and a carbon dioxide temperature between 135 degrees Fahrenheit and 185 degrees Fahrenheit.

15. The method of claim 13, wherein extracting oil from the dried spent coffee ground material via supercritical carbon dioxide extraction comprises extracting oil from the dried spent coffee ground material via supercritical carbon dioxide extraction with ethanol as a cosolvent to produce the coffee flour material.

16. The method of claim 13, further comprising washing the coffee flour material with ethanol.

17. A method for production of a cocoa powder substitute comprising:
drying a spent coffee ground material to produce a dried spent coffee ground material;
extracting oil from the dried spent coffee ground material to produce a coffee flour material; and
flavoring the coffee flour material via a cocoa-homologous fermentation process.

18. A method for production of a cocoa powder substitute comprising:
drying a spent coffee ground material to produce a dried spent coffee ground material;
extracting oil from the dried spent coffee ground material to produce a coffee flour material; and
flavoring the coffee flour material via a fermentation process to produce a cocoa-homologous flavor in the coffee flour material.

19. The method of claim 18, wherein flavoring the coffee flour material via the fermentation process to produce a cocoa-homologous flavor in the coffee flour material comprises flavoring the coffee flour material via a cocoa-homologous fermentation process to produce a cocoa-homologous flavor in the coffee flour material.

20. The method of claim 18, further comprising treating the spent coffee ground material with an alkalizing agent to produce an alkalized cocoa powder substitute characterized by a pH between 7 and 8.

* * * * *